US009116352B2

(12) United States Patent
Ushiyama (10) Patent No.: US 9,116,352 B2
(45) Date of Patent: Aug. 25, 2015

(54) OPTICAL ELEMENT, DISPLAY APPARATUS, AND METHOD FOR MANUFACTURING OPTICAL ELEMENT

(71) Applicant: Seiko Epson Corporation, Tokyo (JP)

(72) Inventor: Kazuhiro Ushiyama, Okaya (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 14/275,748

(22) Filed: May 12, 2014

(65) Prior Publication Data

US 2014/0334009 A1　Nov. 13, 2014

(30) Foreign Application Priority Data

May 13, 2013　(JP) ................................. 2013-100994

(51) Int. Cl.
*G02B 27/01*　(2006.01)
*G02B 27/14*　(2006.01)
*G02B 27/10*　(2006.01)

(52) U.S. Cl.
CPC .......... *G02B 27/144* (2013.01); *G02B 27/1073* (2013.01); *G02B 27/017* (2013.01); *G02B 2027/0178* (2013.01); *Y10T 428/24521* (2015.01); *Y10T 428/31938* (2015.04)

(58) Field of Classification Search
CPC ............. G02B 27/144; G02B 27/1073; G02B 27/017; G02B 2027/0178; G02B 27/142
See application file for complete search history.

(56) References Cited

U.S. PATENT DOCUMENTS

| 3,559,090 A | 1/1971 | Refermat et al. |
|---|---|---|
| 2005/0219724 A1 | 10/2005 | Teramoto et al. |
| 2011/0261457 A1 | 10/2011 | Nomaru et al. |
| 2013/0083404 A1 | 4/2013 | Takagi et al. |
| 2013/0135747 A1 | 5/2013 | Yano |

FOREIGN PATENT DOCUMENTS

| JP | 2000-329985 A | 11/2000 | |
|---|---|---|---|
| JP | 2004-317828 A | 11/2004 | |
| JP | 2005-292462 A | 10/2005 | |
| JP | 2006-154388 | * 6/2006 | ............... G02B 1/10 |
| JP | 2006-154388 A | 6/2006 | |
| JP | 2008-083188 A | 4/2008 | |
| JP | 2011-232481 A | 11/2011 | |
| JP | 2012-027412 A | 2/2012 | |
| JP | 2013-76847 A | 4/2013 | |
| JP | 2013-109301 A | 6/2013 | |
| JP | 2014-38227 A | 2/2014 | |

* cited by examiner

*Primary Examiner* — Joseph P Martinez
(74) *Attorney, Agent, or Firm* — ALG Intellectual Property, LLC (57) ABSTRACT

A method for manufacturing an optical element includes forming a functional layer (half mirror layer) on a first face of a first translucency member that is made of cyclo olefin polymer or cyclo olefin copolymer, and forming an inorganic coating layer having translucency (silicon oxide layer) on a second face of a second translucency member that is made of cyclo olefin polymer or cyclo olefin copolymer. The method for manufacturing an optical element further includes bonding the first face side of the first translucency member to the second face side of the second translucency member by an adhesive layer.

8 Claims, 7 Drawing Sheets

A: NO TREATMENT
B: O₂ PLASMA
C: EXCIMER ULTRAVIOLET RAY
D: LOW PRESSURE MERCURY LAMP
E: INORGANIC COATING LAYER
   (PRESENT INVENTION)

OPTICAL ELEMENT, DISPLAY APPARATUS, AND METHOD FOR MANUFACTURING OPTICAL ELEMENT

BACKGROUND

1. Technical Field

The present invention relates to an optical element including a functional layer between a first translucency member and a second translucency member, a display apparatus including an optical element, and a method for manufacturing an optical element.

2. Related Art

At the time of manufacturing an optical element including a functional layer between two translucency members, a method for bonding the two translucency members by an adhesive after forming the functional layer on one of the two translucency members, is adopted. For example, when a dichroic mirror is manufactured, after forming the functional layer on an inclined face of a first prism, the inclined face of a second prism is bonded to the inclined face of the first prism by the adhesive (see JPA-2006-154388 and JP-A-2004-317828). Furthermore, in JPA-2006-154388, forming a silicon oxide layer on the inclined face of the second prism, and thereby improving a wavefront aberration and wettability of a thermosetting adhesive such as an epoxy resin, are disclosed.

Since the prisms according to JP-A-2006-154388 and JP-A-2004-317828 are made of inorganic materials, there are problems that it is not possible to achieve a weight reduction in the optical element and a degree of freedom in shape is low.

Here, the inventors propose to configure an optical element by using the translucency member manufactured of resin as at least one of the two translucency members. Moreover, the inventors propose to configure an optical element by using the translucency member made of cyclo olefin polymer or cyclo olefin copolymer, paying attention to cyclo olefin polymer or cyclo olefin copolymer having characteristics that transmittance is high and degradation due to moisture absorption is less likely to occur.

However, since a surface of the translucency member which is made of cyclo olefin polymer or cyclo olefin copolymer is inactive, adhesive properties are poor. On the other hand, when the translucency members which are manufactured of resins are bonded by the adhesive, it is general to improve adhesive strength by surface reforming such as light irradiation depending on a low pressure mercury lamp, irradiation with excimer ultraviolet light, plasma irradiation, and corona electric discharge. However, if the surface treatment is performed, the transmittance is decreased due to transmutation, and thus it is not suitable for manufacturing the optical element. For example, the translucency member which is made of cyclo olefin copolymer has transmittance properties indicated as a line L0 in FIG. 7, but if the light irradiation is performed depending on the low pressure mercury lamp, the transmittance is decreased to a level indicated as a line L1. Furthermore, if the irradiation with the excimer ultraviolet light is performed, the transmittance is decreased to a level indicated as a line L2.

SUMMARY

An advantage of some aspects of the invention is to provide an optical element that is capable of firmly gluing a translucency member which is made of cyclo olefin polymer or cyclo olefin copolymer, to a translucency member on which a functional layer is formed, while suppressing deterioration of optical properties, a display apparatus including an optical element, and a method for manufacturing an optical element.

According to an aspect of the invention, there is provided an optical element including a first translucency member, a second translucency member that is made of cyclo olefin polymer or cyclo olefin copolymer, a functional layer that is formed between the first translucency member and the second translucency member, an adhesive layer having translucency that is formed between the functional layer and the second translucency member, and a first inorganic coating layer having translucency that is formed between the adhesive layer and the second translucency member.

According to another aspect of the invention, there is provided a method for manufacturing an optical element including forming a functional layer on a first face of a first translucency member, forming a first coating layer having translucency on a second face of a second translucency member that is made of cyclo olefin polymer or cyclo olefin copolymer, and bonding the first face side of the first translucency member to the second face side of the second translucency member by an adhesive layer.

If the optical element is configured as described above, the second translucency member that is made of cyclo olefin polymer or cyclo olefin copolymer is used, and thus there are advantages that a weight reduction can be achieved and a degree of freedom in shape is high. Furthermore, the second translucency member that is made of cyclo olefin polymer or cyclo olefin copolymer, has a low affinity to an adhesive, but the first inorganic coating layer having translucency is formed on the second translucency member, and thus the second translucency member can be firmly glued to the first translucency member. Accordingly, since it is not necessary to perform surface reforming such as light irradiation depending on a low pressure mercury lamp, irradiation with excimer ultraviolet light, plasma irradiation, and corona electric discharge, there is no possibility that transmittance is decreased due to the surface reforming.

It is preferable that the first translucency member is made of cyclo olefin polymer or cyclo olefin copolymer.

It is preferable that the adhesive layer is made of an ultraviolet curable adhesive. According to the configuration, it is not necessary to thermally cure the adhesive at a high temperature, and thus the degradation due to heat does not occur, in the second translucency member that is made of cyclo olefin polymer or cyclo olefin copolymer.

It is preferable that the first inorganic coating layer is made of silicon oxide. Since the silicon oxide layer has a refractive index equivalent to that of the adhesive layer, it is possible to suppress a change in optical properties even in case of arranging the silicon oxide layer (the first inorganic coating layer).

In this case, a face of a side on which the functional layer is positioned in the first translucency member, and a face which comes in contact with the first inorganic coating layer in the second translucency member, may be planes. Furthermore, between the face of the side on which the functional layer is positioned in the first translucency member and the face which comes in contact with the first inorganic coating layer in the second translucency member, one face may be a convex face, and the other face may be a concave face.

It is preferable that a second inorganic coating layer that is formed between the functional layer and the adhesive layer is included. The method for manufacturing an optical element may include forming the second inorganic coating layer on the face of the opposite side of the first translucency member with respect to the functional layer, between the forming the functional layer and the bonding.

In this case, the functional layer may be, for example, a half mirror layer.

According to a further aspect of the invention, there is provided a display apparatus including an optical element, including an image forming apparatus that emits image light, in which the optical element includes a light incidence unit on which the image light from the image forming apparatus is incident, and a light emission unit on which the image light incident from the light incidence unit is reflected by the half mirror layer and is emitted. According to the configuration, a user can observe scenery or the like which is located on the other side of the half mirror layer while observing the image.

BRIEF DESCRIPTION OF THE DRAWINGS

The invention will be described with reference to the accompanying drawings, wherein like numbers reference like elements.

FIGS. 3A to 3C are diagrams illustrating an evaluation result of bonding strength of the optical element to which the invention is applied, or the like.

DESCRIPTION OF EXEMPLARY EMBODIMENTS

Hereinafter, embodiments of the invention will be described. In the drawings to which is referred in the following description, scales of each layer and each member are made be different, in order to become each layer and each member having identifiable sizes on the drawings.

Embodiment 1

Configuration of Optical Element

Figure 1A:
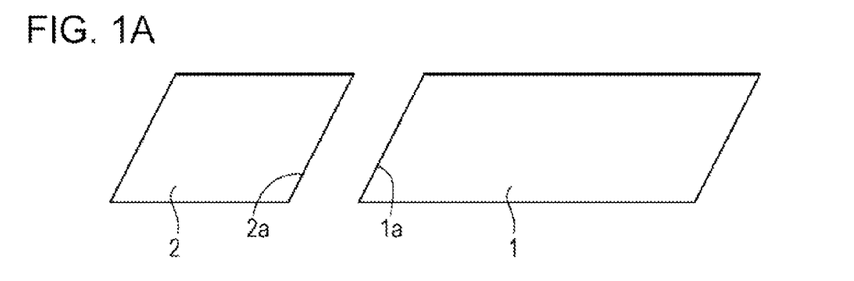
FIGS. 1A to 1C are diagrams illustrating an optical element according to Embodiment 1 of the invention.
Figure 1B:
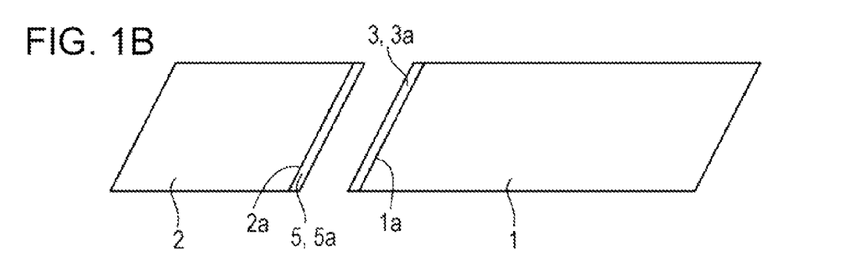
Figure 1C:
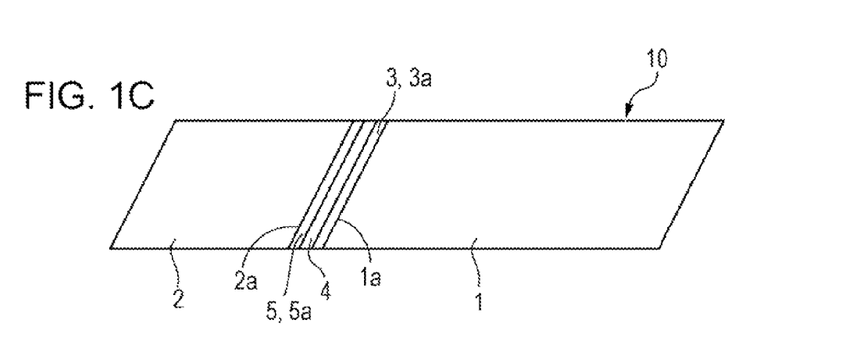

FIGS. 1A to 1C are diagrams illustrating an optical element according to Embodiment 1 of the invention. FIG. 1A is a diagram illustrating translucency members which are used in the optical element, FIG. 1B is a diagram illustrating a state before bonding the two translucency members, and FIG. 1C is a diagram illustrating the state as an optical element by bonding the two translucency members.

An optical element 10 which is shown in FIG. 1C, has a structure that two translucency members are bonded by an adhesive layer 4 interposing a functional layer 3 therebetween. More specifically, the optical element 10 includes a first translucency member 1, a second translucency member 2 that is made of cyclo olefin polymer or cyclo olefin copolymer, the functional layer 3 that is formed between the first translucency member 1 and the second translucency member 2, and the adhesive layer 4 having translucency that is formed between the functional layer 3 and the second translucency member 2. In the embodiment, the first translucency member 1 is also made of cyclo olefin polymer or cyclo olefin copolymer, in the same manner as that of the second translucency member 2. Cyclo olefin polymer or cyclo olefin copolymer is a resin material showing high light transmission properties in a visible region, and there is an advantage that degradation due to moisture absorption is small. The first translucency member 1 and the second translucency member 2 are the members which are manufactured by metallic molding, respectively.

In the embodiment, the first translucency member 1 is the member having a block shape, and therefore, a first face 1a a which is bonded to the second translucency member 2 becomes an inclined face inclined with respect to both faces of the first translucency member 1. In the same manner as the first translucency member 1, the second translucency member 2 is also the member having the block shape, and thus a second face 2a which is bonded to the first translucency member 1 becomes the inclined face inclined with respect to both of the faces of the second translucency member 2. The adhesive layer 4 is an acrylic based ultraviolet curable adhesive or an epoxy based ultraviolet curable adhesive. In the embodiment, the functional layer 3 is a half mirror layer 3a interposing a thin silver layer between dielectric layers of high refractive indexes.

In the optical element 10 according to the configuration described above, when an inorganic coating layer 5 having translucency is formed between the second face 2a of the second translucency member 2 and the adhesive layer 4, the inorganic coating layer 5 is made of a film which is formed on the second face 2a of the second translucency member 2, before bonding the first translucency member 1 to the second translucency member 2. Therefore, the adhesive layer 4 does not directly come into contact with the second face 2a of the second translucency member 2. In the embodiment, the inorganic coating layer 5 is made of a silicon oxide layer 5a.

Method for Manufacturing Optical Element 10

If the optical element 10 which is shown in FIG. 1C is manufactured, the first translucency member 1 and the second translucency member 2 are prepared as shown in FIG. 1A.

Next, as shown in FIG. 1B, in the forming the functional layer, the functional layer 3 (half mirror layer 3a) is formed on the first face 1a of the first translucency member 1, by a method such as vapor deposition. Moreover, in the forming the coating layer, the inorganic coating layer 5 (silicon oxide layer 5a) having translucency is formed on the second face 2a of the second translucency member 2, by a CVD method or the vapor deposition method.

Next, in the bonding which is shown in FIG. 1C, the first face 1a side of the first translucency member 1 is bonded to the second face 2a side of the second translucency member 2 by the adhesive layer 4. More specifically, after applying the ultraviolet curable adhesive to at least one of a surface of the functional layer 3 which is formed on the first face 1a of the first translucency member 1 and the surface of the inorganic coating layer 5 which is formed on the second face 2a of the second translucency member 2, the first face 1a side of the first translucency member 1 is butted to the second face 2a of the second translucency member 2 so as to interpose an adhesive therebetween from the both sides. In the state described above, the adhesive is irradiated with ultraviolet light and the adhesive is cured.

Other Configuration Example

Figure 2A:
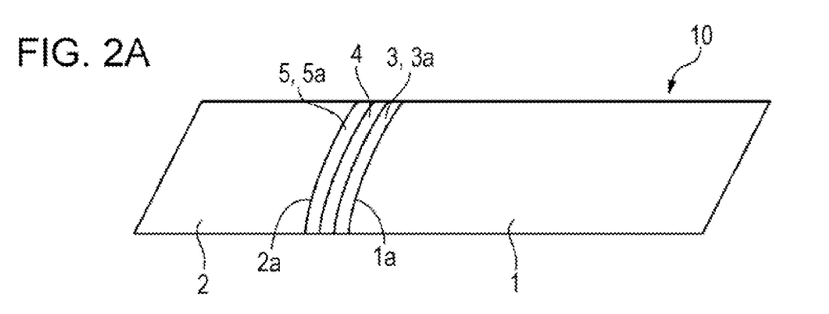
FIG. 2A and FIG. 2B are diagrams illustrating a modification example of the optical element to which the invention is applied.
Figure 2B:
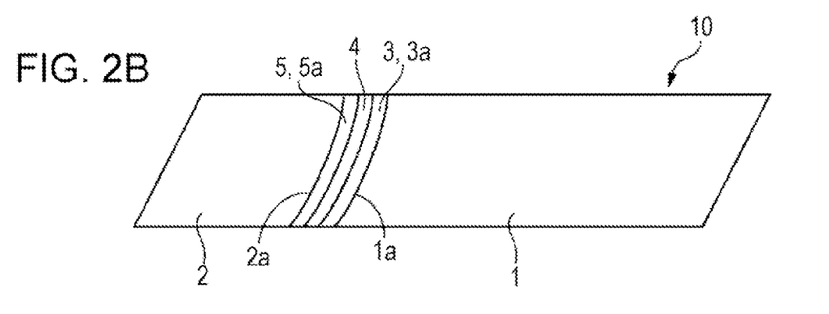

FIG. 2A and FIG. 2B are diagrams illustrating a modification example of the optical element 10 to which the invention is applied. In the embodiment described above, the face (first face 1a) of the side on which the functional layer 3 is positioned in the first translucency member 1, and the face (second face 2a) which comes in contact with the inorganic coating layer 5 in the second translucency member 2, are planes. However, between the first face 1a of the first translucency member 1 and the second face 2a of the second translucency member 2, one face may be a convex face, and the other face may be a concave face.

For example, in the optical element 10 shown in FIG. 2A, if the first face 1a of the first translucency member 1 is the convex face, the second face 2a of the second translucency member 2 is the concave face which is curved along the first face 1a. In contrast, in the optical element 10 shown in FIG. 2B, if the first face 1a of the first translucency member 1 is the concave face, the second face 2a of the second translucency member 2 is the convex face which is curved along the first face 1a.

Here, it is possible to adopt the configuration that the first face 1a of the first translucency member 1 and the second face 2a of the second translucency member 2 have spherical shapes and are curved, and to adopt the configuration that the first face 1a of the first translucency member 1 and the second face 2a of the second translucency member 2 have aspherical shapes and are curved.

Evaluation Result of Bonding Strength of Optical Element 10

Figure 3A:
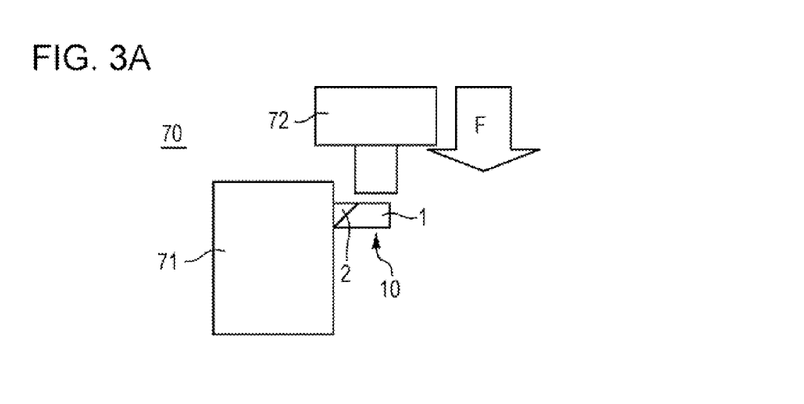
Figure 3B:
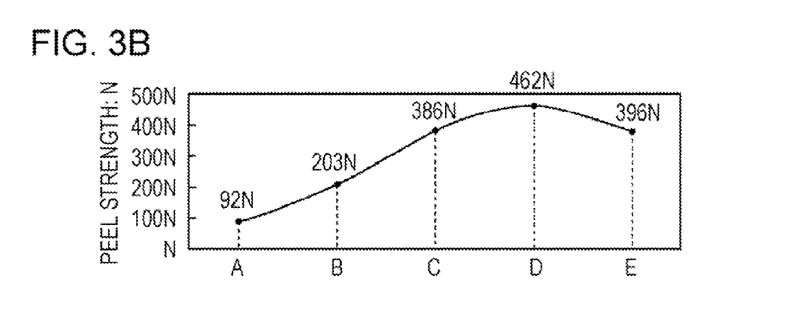
Figure 3C:
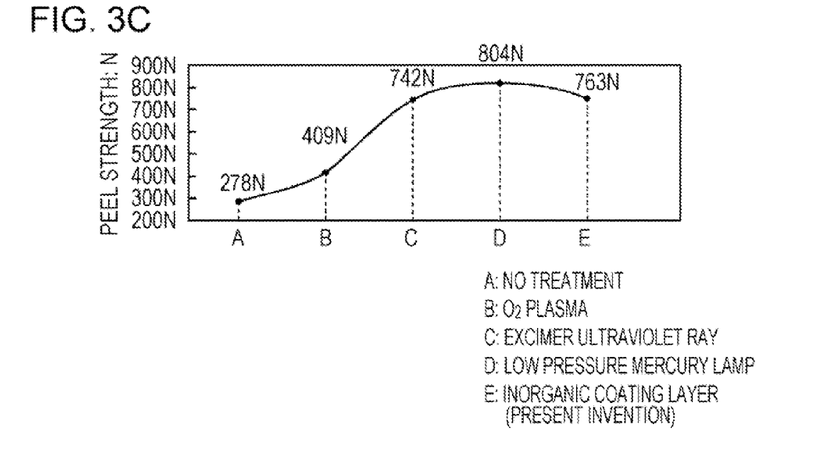

FIGS. 3A to 3C are diagrams illustrating an evaluation result of bonding strength of the optical element 10 to which the invention is applied, or the like. FIG. 3A is a diagram illustrating a method for evaluating, FIG. 3B is a diagram illustrating the evaluation result of the bonding strength when the first face 1a and the second face 2a are the planes, and FIG. 3C is a diagram illustrating the evaluation result of the bonding strength when the first face 1a and the second face 2a are curved.

When the bonding strength of the optical element 10 to which the invention is applied is evaluated, in an evaluation device 70 shown in FIG. 3A, a load shown as an arrow F is applied to the first translucency member 1 by a pressure head 72, in the state of holding the second translucency member 2 of the optical element 10 by a fixing apparatus 71. Therefore, the load is measured in case of peeling off a bonding face of the first translucency member 1 and the second translucency member 2.

FIG. 3B shows the evaluation result of the bonding strength when the first face 1a and the second face 2a are the planes (see FIGS. 1A to 1C), and FIG. 3C shows the evaluation result of the bonding strength when the first face 1a and the second face 2a are curved (see FIG. 2A and FIG. 2B). In FIG. 3B and FIG. 3C, the evaluation results of the optical element 10 (configuration using the inorganic coating layer 5) to which the invention is applied, are shown as a condition E. Furthermore, in FIG. 3B and FIG. 3C, the evaluation results in case of no surface treatment without the inorganic coating layer 5 are shown as a condition A, the evaluation results are shown in case of the surface treatment using $O_2$ plasma (condition B), the evaluation results are shown in case of the surface treatment using excimer ultraviolet light (condition C), and the evaluation results are shown in case of the surface treatment using a low pressure mercury lamp (condition D).

As shown in FIG. 3B and FIG. 3C, in the optical element 10 (configuration using the inorganic coating layer 5) to which the invention is applied, the bonding strength is remarkably improved, in comparison with the condition A of the case of no surface treatment without the inorganic coating layer 5. Therefore, the optical element 10 has the bonding strength equivalent to that of the surface treatment using the excimer ultraviolet light (condition C) or that of the surface treatment using the low pressure mercury lamp (condition D).

Figure 7:
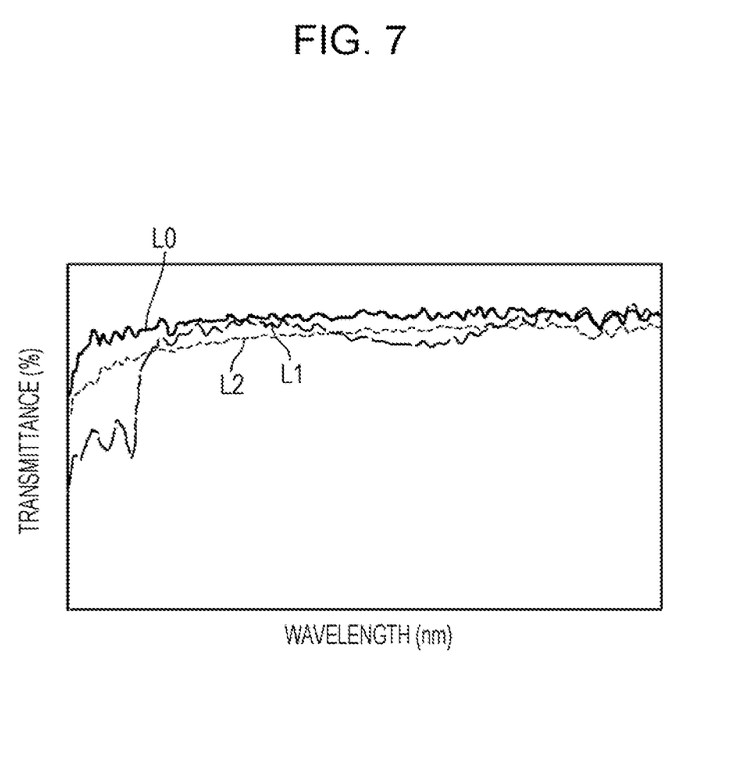
FIG. 7 is a diagram illustrating a decrease of transmittance in case of performing a face treatment on a translucency member that is made of cyclo olefin polymer.

Furthermore, in the optical element 10 (configuration using the inorganic coating layer 5) to which the invention is applied, a decrease of transmittance as described with reference to FIG. 7, does not occur, differently from the condition B, the condition C and the condition D. Moreover, in the optical element 10 (configuration using the inorganic coating layer 5) to which the invention is applied, discoloration of a base material or the like, does not occur, differently from the condition B, the condition C and the condition D.

Main Effect of Embodiment

As described above, if the optical element 10 is configured according to the optical element 10 of the embodiment and the method for manufacturing thereof, the second translucency member 2 that is made of cyclo olefin polymer or cyclo olefin copolymer is used, and thus there are advantages that a weight reduction can be achieved and a degree of freedom in shape is high.

Furthermore, the second translucency member 2 that is made of cyclo olefin polymer or cyclo olefin copolymer, has a low affinity to the adhesive, but the inorganic coating layer 5 having translucency is formed on the second translucency member 2, and thus the second translucency member 2 can be firmly glued to the first translucency member 1. Accordingly, since it is not necessary to perform surface reforming such as light irradiation depending on the low pressure mercury lamp, irradiation with the excimer ultraviolet light, plasma irradiation, and corona electric discharge, there is no possibility that the transmittance is decreased due to the surface reforming.

In the embodiment, the first translucency member 1 is also made of cyclo olefin polymer or cyclo olefin copolymer, in the same manner as that of the second translucency member 2. Therefore, in comparison with the case of using a glass material or the like in any of the first translucency member 1 and the second translucency member 2, it is possible to achieve the weight reduction and to manufacture the various shapes by molding. Additionally, cyclo olefin polymer and cyclo olefin copolymer have low moisture absorption properties, and thus the decrease in translucency due to the moisture absorption is less likely to occur.

In the embodiment, since the adhesive layer 4 is the ultraviolet curable adhesive layer, it is not necessary to thermally cure the adhesive at a high temperature. Therefore, the degradation due to heat does not occur, in the first translucency member 1 and the second translucency member 2 that are made of cyclo olefin polymer or cyclo olefin copolymer.

Moreover, in the embodiment, the inorganic coating layer 5 is the silicon oxide layer 5a, and the silicon oxide layer 5a has the refractive index equivalent to that of the adhesive layer 4. Therefore, it is possible to suppress a change in optical properties of the optical element 10 even in case of arranging the silicon oxide layer 5a (inorganic coating layer 5).

In the embodiment, the functional layer 3 is the half mirror layer 3a which is made of a multilayered film laminated with the thin silver layer and other thin inorganic layer. Therefore, polarization dependence and incident angle dependence thereof are small, in a wide wavelength range such as the whole visible light region. Hence, as described below with reference to FIG. 5, FIG. 6A and FIG. 6B, the optical element 10 is suitable for being applied to a see-through type display apparatus in which image light is reflected by the half mirror layer 3a and is emitted from a light emission unit while advancing the image light which is incident on a light incidence unit of the optical element 10 within the optical element 10. That is, it is suitable for observing image information which is reflected by the half mirror layer 3a while transmittedly observing external light (scenery or the like) which is transmitted through the half mirror layer 3a. Furthermore, since the optical element 10 has the configuration that the functional layer 3 (half mirror layer 3a) is arranged between the first translucency member 1 and the second translucency member 2 of the same materials, the transmitted light goes straight. Therefore, it is possible to reduce a distortion in the transmitted image of the external light.

Embodiment 2

Figure 4A:
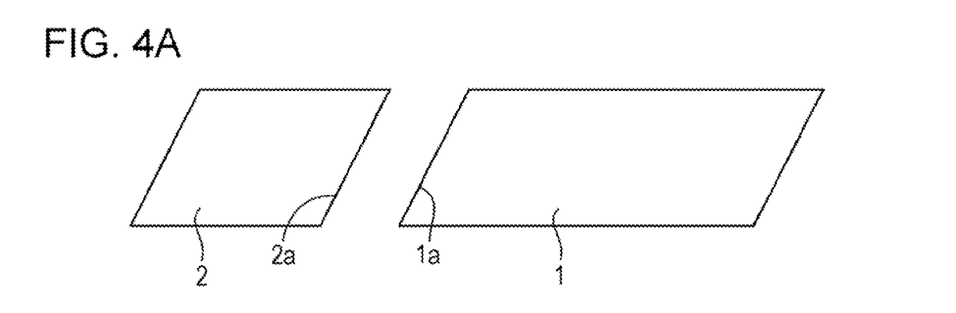
FIGS. 4A to 4D are diagrams illustrating an optical element according to Embodiment 2 of the invention.
Figure 4B:
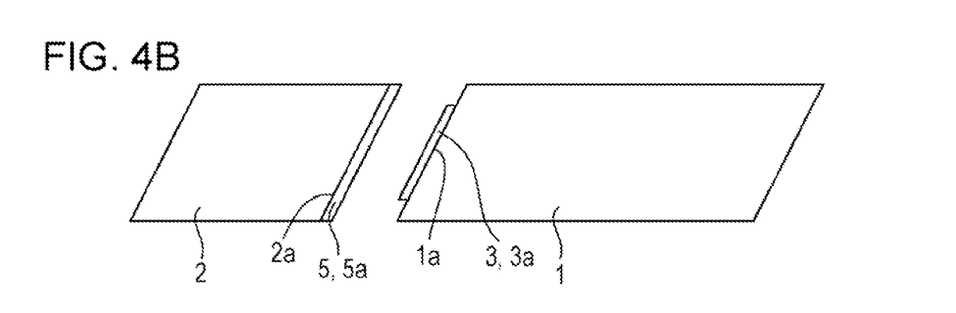
Figure 4C:
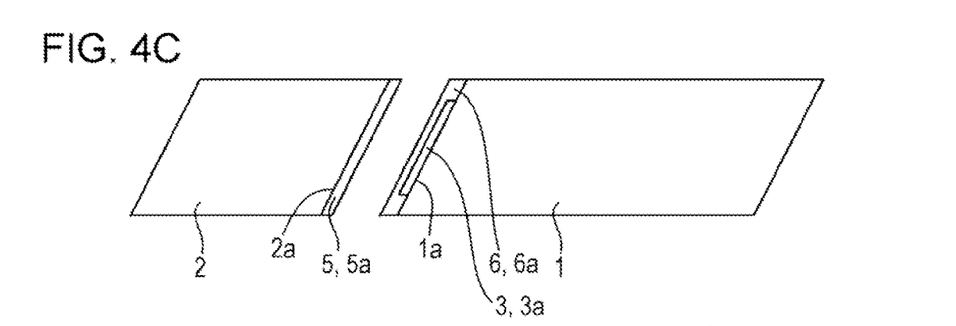
Figure 4D:
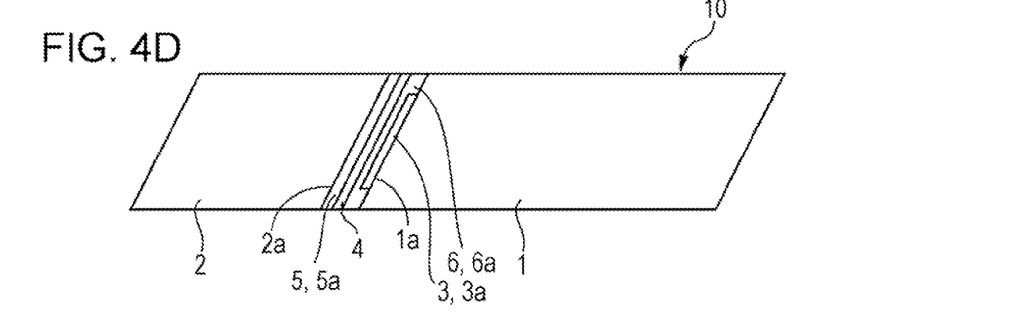

FIGS. 4A to 4D are diagrams illustrating an optical element according to Embodiment 2 of the invention. FIG. 4A is a diagram illustrating the translucency member used in the optical element, FIG. 4B is a diagram illustrating the state of arranging the coating layer on the second translucency member side, FIG. 4C is a diagram illustrating the state of arranging the coating layer on the first translucency member side, and FIG. 4D is a diagram illustrating the state of making as the optical element by bonding the two translucency members.

The optical element 10 shown in FIG. 4D, includes the second translucency member 2 that is made of cyclo olefin polymer or cyclo olefin copolymer, the functional layer 3 that is formed between the first translucency member 1 and the second translucency member 2, the adhesive layer 4 having translucency that is formed between the functional layer 3 and the second translucency member 2, in the same manner as Embodiment 1. In the embodiment, the first translucency member 1 is also made of cyclo olefin polymer or cyclo olefin copolymer, in the same manner as that of the second translucency member 2. The adhesive layer 4 is the acrylic based ultraviolet curable adhesive or the epoxy based ultraviolet curable adhesive. In the embodiment, the functional layer 3 is the half mirror layer 3a interposing the thin silver layer between the dielectric layers of high refractive indexes.

In the optical element 10 according to the configuration described above, an inorganic coating layer 5 (first inorganic coating layer) having translucency is formed between the second face 2a of the second translucency member 2 and the adhesive layer 4. The inorganic coating layer 5 is made of the film which is formed on the second face 2a of the second translucency member 2 before bonding the first translucency member 1 to the second translucency member 2. In the embodiment, the inorganic coating layer 5 is made of the silicon oxide layer 5a.

Moreover, in the optical element 10 of the embodiment, an inorganic coating layer 6 (second inorganic coating layer) having translucency is formed between the functional layer 3 and the adhesive layer 4. The inorganic coating layer 6 is made of the film which is formed on the face of the opposite side of the first translucency member 1 with respect to the functional layer 3 before bonding the first translucency member 1 to the second translucency member 2. In the embodiment, the inorganic coating layer 6 is made of a silicon oxide layer 6a, in the same manner as that of the inorganic coating layer 5.

Here, when the functional layer 3 is formed on a part of the first face 1a of the first translucency member 1, the first face 1a of the first translucency member 1 is partially exposed from the functional layer 3. Accordingly, the inorganic coating layer 6 is formed even on a portion which is exposed from the functional layer 3, in the first face 1a of the first translucency member 1. Therefore, without directly coming into contact with the second face 2a of the second translucency member 2, the adhesive layer 4 does not directly come into contact with the first face 1a of the first translucency member 1.

If the optical element 10 which is shown in FIG. 4D is manufactured, the first translucency member 1 and the second translucency member 2 are prepared as shown in FIG. 4A. Next, as shown in FIG. 4B, in the forming the functional layer, the functional layer 3 (half mirror layer 3a) is formed on the first face 1a of the first translucency member 1, by the method such as vapor deposition. Then, in the forming the first coating layer, the inorganic coating layer 5 (silicon oxide layer 5a) having translucency is formed on the second face 2a of the second translucency member 2, by the CVD method or the vapor deposition method.

Next, in the forming the second coating layer shown in FIG. 4C, the inorganic coating layer 6 (silicon oxide layer 6a) having translucency is formed on the face of the opposite side of the first translucency member 1 with respect to the functional layer 3, by the CVD method or the vapor deposition method. As a result, the inorganic coating layer 6 is formed even on the portion which is exposed from the functional layer 3, in the first face 1a of the first translucency member 1.

Next, in the bonding shown in FIG. 4D, the first face 1a side of the first translucency member 1 is bonded to the second face 2a of the second translucency member 2 by the adhesive layer 4. More specifically, after applying the ultraviolet curable adhesive to at least one of the surface of the functional layer 3 which is formed on the first face 1a of the first translucency member 1 and the surface of the inorganic coating layer 5 which is formed on the second face 2a of the second translucency member 2, the first face 1a side of the first translucency member 1 is butted to the second face 2a of the second translucency member 2 so as to interpose the adhesive therebetween from the both sides. In the state described above, the adhesive is irradiated with the ultraviolet light and the adhesive is cured.

Accordingly, the embodiment described above has the same effect as Embodiment 1. Furthermore, in the embodiment, since the functional layer 3 is formed on the part of the first face 1a of the first translucency member 1, the first face 1a of the first translucency member 1 is partially exposed from the functional layer 3, but the inorganic coating layer 6 is formed on the exposed portion. Therefore, even when the affinity between the first translucency member 1 that is made of cyclo olefin polymer or cyclo olefin copolymer and the adhesive is low, the first translucency member 1 can be firmly bonded to the second translucency member 2.

In the embodiment, the forming the second coating layer is performed after the forming the first coating layer, but if the forming the second coating layer and the forming the first coating layer are performed between the forming the functional layer and the bonding, the forming the second coating layer may be performed before the forming the first coating layer, or the forming the second coating layer and the forming the first coating layer may be performed at the same time.

Moreover, in the embodiment, as described with reference to FIG. 2A and FIG. 2B, between the first face 1a of the first translucency member 1 and the second face 2a of the second translucency member 2, one face may be the convex face, and the other face may be the concave face.

Example of Use of Optical Element 10

The optical element 10 to which the invention is applied, can be also used as a view finder for camera or the like, other than the display apparatus which is described below with reference to FIG. 5, FIG. 6A and FIG. 6B.

Example of Other Configuration of Optical Element 10

In the embodiment described above, the half mirror layer 3a is formed as the functional layer 3, but a polarization separation film, a dichroic film or the like, may be formed as the functional layer 3.

Example of Configuration of Display Apparatus

Figure 5:
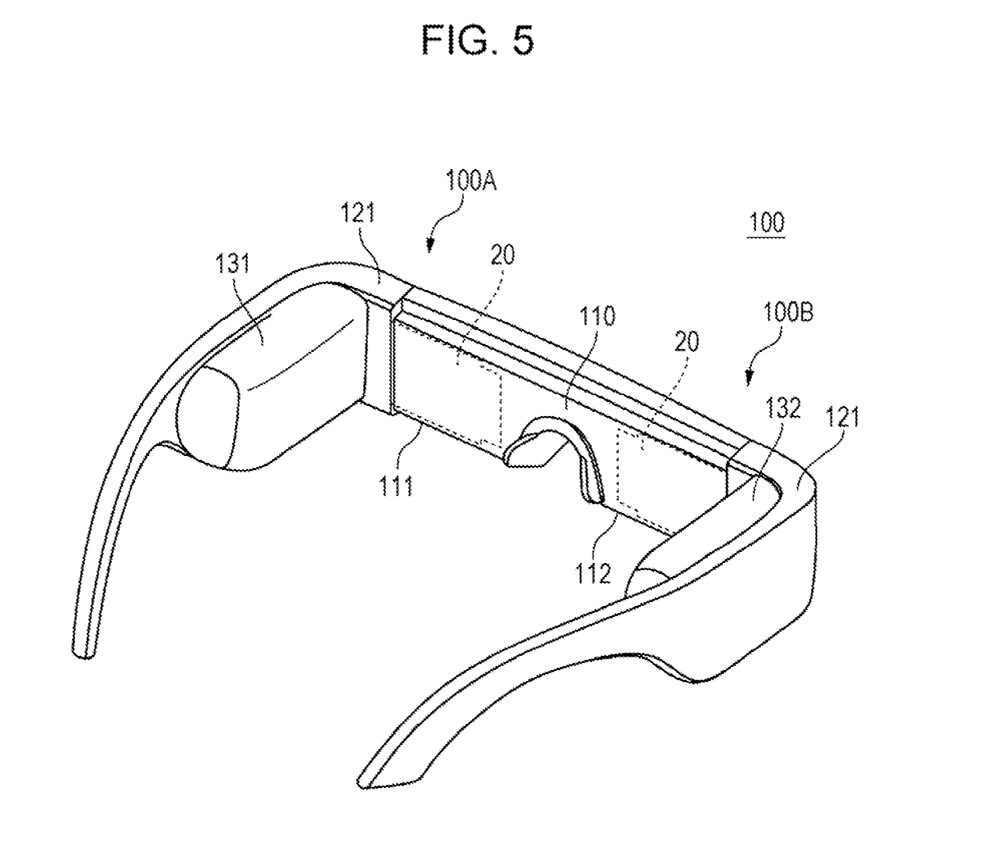
FIG. 5 is a perspective view illustrating an example of a display apparatus using the optical element to which the invention is applied.

FIG. 5 is a perspective view illustrating an example of a display apparatus using the optical element 10 to which the invention is applied. FIG. 6A and FIG. 6B are diagrams illustrating an optical system of the display apparatus shown in FIG. 5. FIG. 6A is a plan view, and FIG. 6B is a front view.

In a display apparatus 100 which is described below, the optical element 10 to which the invention is applied, is used as a light guide apparatus 20. In this case, one of the first translucency member 1 and the second translucency member 2, is used as a light guide member 21 which is described below, and the other is used as a light transmission member 23.

In the following description, the case that the first translucency member 1 is used as the light guide member 21 and the second translucency member 2 is used as the light transmission member 23, is used as an example. Accordingly, the first face 1a of the first translucency member 1 corresponds to a fourth reflection face 21d of the light guide member 21, and the second face 2a of the second translucency member 2 corresponds to a third face 23c of the light transmission member 23.

The display apparatus 100 shown in FIG. 5, is a head mounted display having an appearance similar to spectacles. Therefore, the display apparatus 100 can make an observer wearing the display apparatus 100 realize the image light depending on a virtual image, and make the observer observe an external image in the manner of the see-through type. The display apparatus 100 includes an optical panel 110 that covers the front of eyes of the observer, a frame 121 that supports the optical panel 110, a first drive unit 131 which is arranged in the vicinity of a corner of the frame 121, and a second drive unit 132 which is arranged in the vicinity of the corner of the frame 121. Here, if the optical panel 110 has a first panel portion 111 and a second panel portion 112, the first panel portion 111 and the second panel portion 112 are components having a plate shape which are integrally connected to each other at the center thereof. A first display apparatus 100A which is formed in combination with the first panel portion 111 and the first drive unit 131 in the left side of the drawing, is the portion that forms the virtual image for the left eye, and thus the first display apparatus 100A alone functions as a virtual image display apparatus. Moreover, a second display apparatus 100B which is formed in combination with the second panel portion 112 and the second drive unit 132 in the right side of the drawing, is the portion that forms the virtual image for the right eye, and thus the second display apparatus 100B alone functions as a virtual image display apparatus.

Figure 6A:
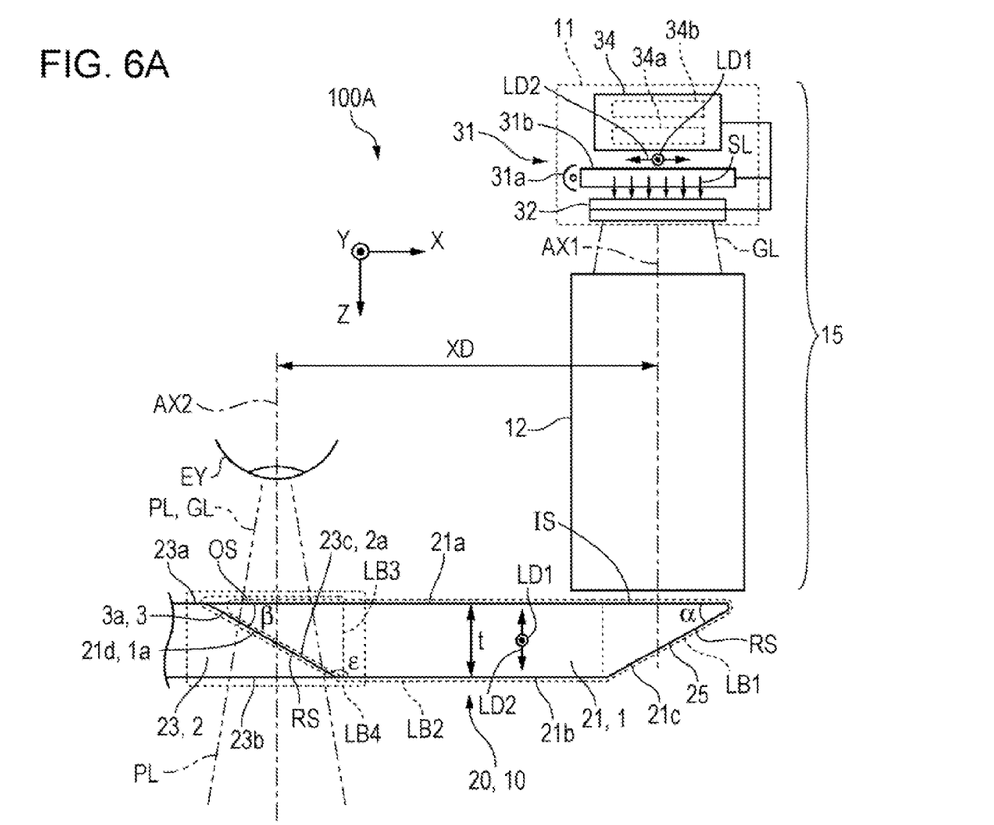
FIG. 6A and FIG. 6B are diagrams illustrating an optical system of the display apparatus shown in FIG. 5.
Figure 6B:
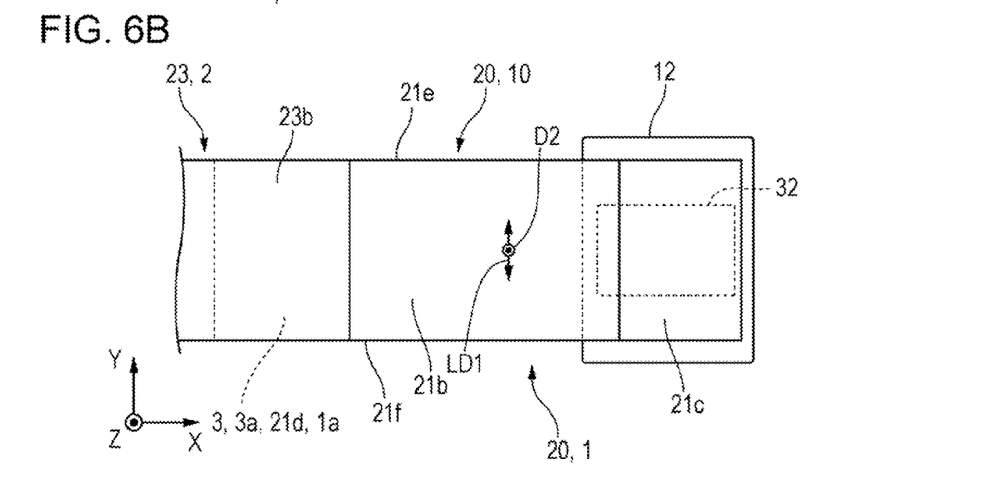

As shown in FIG. 6A and FIG. 6B, the first display apparatus 100A includes an image forming apparatus 15, a light guide apparatus 20, or the like. Here, the image forming apparatus 15 corresponds to the first drive unit 131 in FIG. 5, and the light guide apparatus 20 corresponds to the first panel portion 111 in FIG. 5. The second display apparatus 100B shown in FIG. 5, has the structure which is similar to that of the first display apparatus 100A, but the structure of the second display apparatus 100B is formed only by reversing left and right in that of the first display apparatus 100A, and thus the detailed description of the second display apparatus 100B is excluded.

The image forming apparatus 15 includes an image forming apparatus main body portion 11 and a projection optical system 12. The image forming apparatus main body portion 11 includes an illumination apparatus 31 that emits two-dimensional illumination light SL, a liquid crystal display device 32 that is a spatial light modulator of the transmission type, and a drive control unit 34 that controls operations of an illumination apparatus 31 and the liquid crystal display device 32.

The illumination apparatus 31 has a light source 31a that generates the light including three colors of red, green and blue, and a backlight light guide unit 31b that diffuses the light from the light source 31a and makes luminous flux having a rectangular section. The liquid crystal display device 32 which is a liquid crystal panel, spatially modulates the illumination light SL from the illumination apparatus 31, and forms the image light such as an moving image which is subjected to display. The drive control unit 34 includes a light source drive circuit 34a, and a liquid crystal drive circuit 34b. The light source drive circuit 34a supplies electric power to the light source 31a of the illumination apparatus 31, and makes the illumination light SL having stable brightness be emitted. The liquid crystal drive circuit 34b forms the color image light which is the source of a moving picture or a still picture as a transmittance pattern, by outputting an image signal or a drive signal with respect to the liquid crystal display device 32. The projection optical system 12 is a collimator lens that makes the image light emitted from each point on the liquid crystal display device 32 be the luminous flux in the parallel state.

In the liquid crystal display device 32, a first direction LD1 corresponds to an extending direction of a vertical section including a first optical axis AX1 which passes by the projection optical system 12, and a specific line which is parallel to a third reflection face 21c of the light guide member 21 described below, and a second direction LD2 corresponds to the extending direction of a cross section including the first optical axis AX1 described above, and a normal line of the third reflection face 21c described above. In other words, in the position of the liquid crystal display device 32, the first direction LD1 corresponds to a Y direction of a vertical direction, and the second direction LD2 corresponds to an X direction of a horizontal direction.

The light guide apparatus 20 (optical element 10) is obtained by bonding the light guide member 21 (first translucency member 1) and the light transmission member 23 (second translucency member 2), and is configured as an optical member having the block shape which extends in parallel with the XY plane as a whole.

In the light guide apparatus 20, the light guide member 21 performs a light guide using total reflection depending on a first reflection face 21a and a second reflection face 21b, and there are the direction which is folded back by the reflection at the time of the light guide, and the direction which is not folded back by the reflection at the time of the light guide. When the image is guided by the light guide member 21, the horizontal direction which is folded back by the reflection of several times at the time of the light guide, that is, the confinement direction is perpendicular to the first reflection face 21a and the second reflection face 21b (parallel to an X axis), and corresponds to the second direction LD2 of the liquid crystal display device 32 in case of spreading a light path to the light source as described below. The vertical direction which is not folded back by the reflection at the time of the light guide, that is, the free propagation direction is parallel to the first reflection face 21a, the second reflection face 21b, and the third reflection face 21c (parallel to a Y axis), and corresponds to the first direction LD1 of the liquid crystal display device 32 in case of spreading the light path to the light source as described below.

The light guide member 21 is a prismatic member having a trapezium shape when seen in plane. The light guide member 21 has the first reflection face 21a, the second reflection face 21b, the third reflection face 21c, and the fourth reflection face 21d, as a side thereof. Furthermore, the light guide member 21 has an upper face 21e and a lower face 21f which are adjacent to the first reflection face 21a, the second reflection face 21b, the third reflection face 21c and the fourth reflection face 21d. The upper face 21e and the lower face 21f face each other. Here, the first reflection face 21a and the second reflection face 21b extend along the XY plane, and are separated having a gap as a thickness t of the light guide member 21 therebetween. Moreover, the third reflection face 21c is inclined at an acute angle α of 45° or less with respect to the XY plane, and the fourth reflection face 21d is inclined, for example, at an acute angle β of 45° or less with respect to the XY plane. The first optical axis AX1 which passes by the third reflection face 21c and the second optical axis AX2 which passes by the fourth reflection face 21d are arranged in parallel, and are separated having the gap as a distance XD.

The light guide member 21 is the item which is integrally formed, but can be considered as the item which is functionally divided into a light incidence unit LB1, a light guide unit LB2, and a light emission unit LB3. The light incidence unit LB1 is the portion having a triangular prism shape. The light incidence unit LB1 has a light incidence face IS which is the part of the first reflection face 21a, and the third reflection face 21c facing the light incidence face IS. The light incidence face IS is the plane of a back side for capturing an image light GL from the image forming apparatus 15, or of the observer side. The light incidence face IS faces the projection optical system 12, and extends perpendicularly to the first optical axis AX1. The third reflection face 21c is a total reflection mirror having the rectangular shape which reflects and guides the image light GL passing through the light incidence face IS within the light guide unit LB2. The third reflection face 21c includes a mirror layer 25. The mirror layer 25 is the total reflection coating, and is formed by performing the making the film of aluminum or the like with the vapor deposition on an inclined face RS of the light guide member 21. The third reflection face 21c is inclined, for example, at the acute angle α of 25° to 27°, with respect to the first optical axis AX1 of the projection optical system 12 or the XY plane. The third reflection face 21c makes the image light GL be obviously combined within the light guide unit LB2 by bending the image light GL which is incident from the light incidence face IS and looks toward the plus Z direction as a whole, so as to be oriented toward the minus X direction around the minus Z direction as a whole.

The light guide unit LB2 includes the first reflection face 21a and the second reflection face 21b which totally reflect the image light bent by the light incidence unit LB1, respectively. The first reflection face 21a and the second reflection face 21b are the two planes which face to each other and extend in parallel with the XY plane. The gap between the first reflection face 21a and the second reflection face 21b (the thickness t of the light guide member 21) is, for example, approximately 9 mm. Here, the first reflection face 21a is assumed to be arranged on the back side close to the image forming apparatus 15, or on the observer side. The second reflection face 21b is assumed to be arranged on a front side distant from the image forming apparatus 15, or on an external side. In this case, the first reflection face 21a is a common face portion of the light incidence face IS and a light emission face OS described below. The first reflection face 21a and the second reflection face 21b, are total reflection faces which use a difference between refractive indexes, and the reflection coating such as the mirror layer is not applied thereto.

First, the image light GL which is reflected by the third reflection face 21c of the light incidence unit LB1, is incident on the first reflection face 21a, and is totally reflected. Next, the image light GL is incident on the second reflection face 21b, and is totally reflected. By repeating the operations, the image light GL is guided to an internal side of the light guide apparatus 20, that is, the minus X direction side on which the light emission unit LB3 is arranged. Since the reflection coating is not applied to the first reflection face 21a and the second reflection face 21b, the external light incident on the second reflection face 21b from the external side, or daylight, passes through the light guide unit LB2 with high transmittance. That is, the light guide unit LB2 has the see-through type which can see through the external image.

The light emission unit LB3 is the part having the triangular prism shape, and includes the light emission face OS which is the part of the first reflection face 21a, and the fourth reflection face 21d facing the light emission face OS. The light emission face OS is the plane of the front side for emitting the image light GL toward an eye EY of the observer. When the light emission face OS is the part of the first reflection face 21a in the same manner as the light incidence face IS, the light emission face OS extends perpendicularly to the second optical axis AX2. In view of a width of the head of the observer or the like, the distance XD between the second optical axis AX2 passing by the light emission unit LB3 and the first optical axis AX1 passing by the light incidence unit LB1, is set to, for example, 50 mm. The fourth reflection face 21d is a flat face having the rectangular shape for reflecting the image light GL which is incident through the first reflection face 21a and the second reflection face 21b, and emitting the image light GL outside the light emission unit LB3. In addition to the fourth reflection face 21d, the half mirror layer 3a is arranged. The half mirror layer 3a is a reflective film having light transmission properties, and is formed by making a metallic reflective film or a dielectric multilayered film on the inclined face RS of the light guide member 21. In view of facilitating the observation of an external light PL in the manner of the see-through type, reflectance with respect to the image light GL of the half mirror layer 3a, is from 10% to 50%.

The fourth reflection face 21d is inclined, for example, at the acute angle α of 25° to 27°, with respect to the second optical axis AX2 perpendicular to the first reflection face 21a or the XY plane. At that time, by the half mirror layer 3a, the fourth reflection face 21d makes the image light GL pass through the light emission face OS by partially reflecting the image light GL which is incident through the first reflection face 21a and the second reflection face 21b of the light guide unit LB2, and bending the image light GL so as to be oriented toward the minus Z direction as a whole. Furthermore, the image light GL which is transmitted through the fourth reflection face 21d, is incident on the light transmission member 23, and is not used in formation of the image.

The light transmission member 23 has the same refractive index as the main body of the light guide member 21, and includes a first face 23a, a second face 23b, and a third face 23c. The first face 23a and the second face 23b extend along the XY plane. Moreover, when the third face 23c is inclined with respect to the XY plane, the third face 23c is arranged in parallel with the fourth reflection face 21d of the light guide member 21, so as to face thereto. That is, the light transmission member 23 is the member having the portion of a wedge shape which is interposed between the second face 23b and the third face 23c.

In the light transmission member 23, the first face 23a is positioned on an extending plane of the first reflection face 21a which is arranged in the light guide member 21, and is positioned on the back side close to the eye EY of the observer. The second face 23b is positioned on the extending plane of the second reflection face 21b which is arranged in the light guide member 21, and is positioned on the front side distant from the eye EY of the observer. The third face 23c is a transmission face having the rectangular shape which is bonded to the fourth reflection face 21d of the light guide member 21 by the adhesive. When The angle which is formed of the first face 23a and the third face 23c, is equal to an angle ∈ between the second reflection face 21b and the fourth reflection face 21d of the light guide member 21, the angle which is formed of the second face 23b and the third face 23c, is equal to the angle β between the first reflection face 21a and the third reflection face 21c of the light guide member 21.

A see-through unit LB4 is configured of the light transmission member 23 and the light guide member 21, in the bonded portion of the both members and the vicinity thereof. That is, in the first face 23a and the second face 23b, since the reflection coating such as the mirror layer is not applied thereto, the external light PL is transmitted with high transmittance, in the same manner as the light guide unit LB2 of the light guide member 21. In the third face 23c, the external light PL is also transmitted with high transmittance. However, the fourth reflection face 21d of the light guide member 21 has the half mirror layer 3a, and thus the external light PL which passes through the third face 23c, is decreased in light amount, for example, by 20%. That is, the observer may observe the image overlapping the image light GL which is decreased in light amount by 20% and the external light PL which is decreased in light amount by 80%.

The entire disclosure of Japanese Patent Application No. 2013-100994, filed May 13, 2013 is expressly incorporated by reference herein.

What is claimed is:

1. An optical element comprising:
a first translucency member;
a second translucency member that includes cyclo olefin polymer or cyclo olefin copolymer;
a functional layer that is formed between the first translucency member and the second translucency member;
an adhesive layer having translucency that is formed between the functional layer and the second translucency member; and
a first inorganic coating layer having translucency that is formed between the adhesive layer and the second translucency member.

2. The optical element according to claim 1, wherein the first translucency member includes cyclo olefin polymer or cyclo olefin copolymer.

3. The optical element according to claim 1, wherein the adhesive layer is made of an ultraviolet curable adhesive.

4. The optical element according to claim 1, wherein the first inorganic coating layer includes silicon oxide.

5. The optical element according to claim 1, wherein between a face of a side on which the functional layer is positioned in the first translucency member and a face which comes in contact with the first inorganic coating layer in the second translucency member, one face is a convex face, and the other face is a concave face.

6. The optical element according to claim 1, further comprising:
a second inorganic coating layer that is formed between the functional layer and the adhesive layer.

7. The optical element according to claim 1, wherein the functional layer is a half mirror layer.

8. A display apparatus including the optical element according to claim 7, comprising:
an image forming apparatus that emits image light,
wherein the optical element includes a light incidence unit on which the image light from the image forming apparatus is incident, and a light emission unit on which the image light incident from the light incidence unit is reflected by the half mirror layer and is emitted.

* * * * *